US010636139B2

(12) United States Patent
Fan Jiang

(10) Patent No.: US 10,636,139 B2
(45) Date of Patent: Apr. 28, 2020

(54) IMAGE PROCESSING APPARATUS UTILIZING KEYPOINTS IN AN IMAGE ANALYSIS AND METHOD THEREOF

(71) Applicant: HTC CORPORATION, Taoyuan (TW)

(72) Inventor: Shu-Jhen Fan Jiang, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 30 days.

(21) Appl. No.: 15/920,593

(22) Filed: Mar. 14, 2018

(65) Prior Publication Data

US 2018/0260946 A1 Sep. 13, 2018

Related U.S. Application Data

(60) Provisional application No. 62/459,075, filed on Feb. 15, 2017.

(51) Int. Cl.
*G06K 9/00* (2006.01)
*G06T 7/00* (2017.01)
(Continued)

(52) U.S. Cl.
CPC ............. *G06T 7/001* (2013.01); *G06T 7/11* (2017.01); *G06T 7/136* (2017.01); *G06T 7/174* (2017.01);
(Continued)

(58) Field of Classification Search
CPC ... G06T 7/001; G06T 7/11; G06T 7/74; G06T 7/174; G06T 7/136
See application file for complete search history.

(56) References Cited

U.S. PATENT DOCUMENTS

| 8,111,923 B2 * | 2/2012 | Csurka | G06K 9/00624 382/170 |
| 8,171,030 B2 * | 5/2012 | Pereira | G06K 9/00711 707/741 |

(Continued)

FOREIGN PATENT DOCUMENTS

| CN | 102379701 A | 3/2012 |
| CN | 106203242 A | 12/2016 |

OTHER PUBLICATIONS

Chinese language office action dated Nov. 6, 2019, issued in application No. TW 107105608, and its translation.

*Primary Examiner* — Amir Alavi
(74) *Attorney, Agent, or Firm* — McClure, Qualey & Rodack, LLP

(57) ABSTRACT

An image processing apparatus and method thereof are provided. The image processing apparatus stores at least a reference image and performs the following operations: (a) receiving an image, (b) determining a plurality of representative keypoints for the image, such as determining the representative keypoints by a density restriction based method, (c) finding out that a matched area in the image corresponds to a first reference image according to the representative keypoints, (d) determining that a matched number between the representative keypoints and a plurality of reference keypoints of the first reference image is less than a threshold, and (e) storing the matched area in the image processing apparatus as a second reference image.

6 Claims, 5 Drawing Sheets

(51) Int. Cl.
*G06T 7/11* (2017.01)
*G06T 7/73* (2017.01)
*G06T 7/174* (2017.01)
*G06T 7/136* (2017.01)
*G06T 7/246* (2017.01)

(52) U.S. Cl.
CPC .............. *G06T 7/246* (2017.01); *G06T 7/73* (2017.01); *G06T 7/74* (2017.01); *G06T 2207/30244* (2013.01)

(56) References Cited

U.S. PATENT DOCUMENTS

| | | | |
|---|---|---|---|
| 8,774,504 B1* | 7/2014 | Sundareswara | G06K 9/00201 |
| | | | 382/165 |
| 8,917,910 B2* | 12/2014 | Rodriguez Serrano | G06K 9/34 |
| | | | 382/105 |
| 9,002,055 B2* | 4/2015 | Funayama | G06T 7/251 |
| | | | 382/103 |
| 9,167,129 B1* | 10/2015 | Subbaian | H04N 1/405 |
| 9,202,129 B2* | 12/2015 | Krishnamoorthi | G06K 9/6211 |
| 9,495,760 B2* | 11/2016 | Swaminathan | G06K 9/00671 |
| 9,704,245 B2* | 7/2017 | Manweiler | G06F 16/5838 |
| 10,163,011 B2* | 12/2018 | Kaehler | H04N 13/344 |
| 10,395,379 B2* | 8/2019 | Lin | G01P 15/02 |
| 2018/0260946 A1* | 9/2018 | Fan Jiang | G06T 7/73 |

* cited by examiner

IMAGE PROCESSING APPARATUS UTILIZING KEYPOINTS IN AN IMAGE ANALYSIS AND METHOD THEREOF

This application claims the benefit of U.S. Provisional Application Ser. No. 62/459,075 filed on Feb. 15, 2017, which are hereby incorporated by reference in its entirety.

CROSS-REFERENCES TO RELATED APPLICATIONS

Not applicable.

BACKGROUND OF THE INVENTION

Field of the Invention

The present invention relates to an image processing apparatus and method thereof. Specifically, the present invention relates to an image processing apparatus and method thereof that determines and utilizes keypoints.

Descriptions of the Related Art

With the rapid development of technology, various image-processing technologies have been widely used in various fields, e.g., Augmented Reality (AR) and security monitoring. Many applications require the image comparison technology to identify and/or trace a target object in an image, and some applications even calculate other information based on the identified/traced target object. Taking some applications of AR as an example, an image captured by a camera needs to be compared with a reference image of the target object, and then calculates the position and the angle of the camera according to a matched area found in the image by comparison.

To identify and/or trace a target object, conventional image comparison technologies store one or more reference images of the target object in advance and compare a to-be-analyzed image with the reference image(s) to determine whether the to-be-analyzed image comprises the target object. Many conventional image comparison technologies utilize feature values (e.g., gradients) of each pixels in the to-be-analyzed image to find keypoints for the to-be-analyzed image, and then compare the found keypoints with keypoints in the reference image, thereby determining whether the to-be-analyzed image comprises the target object.

The conventional image comparison technologies have two obvious drawbacks, one of which is relevant to the way in which the keypoints are selected. As described previously, the conventional image comparison technologies select pixels having stronger feature values in the to-be-analyzed image as the keypoints. When a to-be-analyzed image comprises a target object having unobvious feature values and other objects having obvious feature values (e.g., a chessboard in black and white), the keypoints found by the conventional image comparison technologies will be excessively concentrated in an area where non-target objects are located so that the target object cannot be identified and/or traced successfully.

Another drawback of the conventional image comparison technologies is relevant to the stored reference images of the target object. Many applications need to continuously adopt the image comparison technology to identify and/or trace target objects in multiple to-be-analyzed images. As time goes by, the environment/condition of an image to be compared may change, e.g., the external environment may change (e.g., the brightness changes), the shooting angle of the camera may change, or the texture of the target object of which the image is captured by the camera may change (e.g., a crease is generated on a piece of paper). The conventional image comparison technologies do not update the stored reference image of the target object, so when the environment/condition of an image to be compared changes, an obvious difference may have occurred between the target object in the to-be-analyzed image and the reference image, and thus the target object cannot be identified and/or traced successfully.

Accordingly, an urgent need exists in the art to select appropriate keypoints and update the reference images of the target object so as to obtain a more accurate image comparison result.

SUMMARY OF THE INVENTION

To solve the problems of the conventional image comparison technologies described in the section of related art, the present invention provides an image processing apparatus and method.

An image processing apparatus provided in the present invention comprises a transceiving interface and a processor electrically connected to the transceiving interface. The transceiving interface is configured to receive an image. The processor is configured to determine a plurality of initial keypoints for the image, divide the image into a plurality of areas, and determine at least a part of the initial keypoints as a plurality of representative keypoints of the image according to a threshold and a strength of each of the initial keypoints, wherein a number of the representative keypoints in each of the areas is not greater than the threshold.

Another image processing apparatus provided in the present invention comprises a transceiving interface, a storage, and a processor electrically connected to the transceiving interface and the storage. The transceiving interface is configured to receive an image, and the storage is configured to store at least a reference image. The processor is configured to perform the following operations: (a) determining a plurality of representative keypoints for the image, (b) finding out that a matched area in the image corresponds to a first reference image stored in the storage according to the representative keypoints, (c) determining that a matched number between the representative keypoints and a plurality of reference keypoints of the first reference image is less than a threshold, and (d) storing the matched area of the image in the storage as a second reference image.

An image processing method provided in the present invention is adapted for an electronic apparatus. The image processing method comprises the following steps: (a) receiving an image, (b) determining a plurality of initial keypoints for the image, (c) dividing the image into a plurality of areas, and (d) determining at least a part of the initial keypoints as a plurality of representative keypoints of the image according to a threshold and a strength of each of the initial keypoints, wherein the number of the representative keypoints in each of the areas is not greater than the threshold.

Another image processing method provided in the present invention is adapted for an electronic apparatus. The electronic apparatus stores at least a reference image. The image processing method comprises the following steps: (a) determining a plurality of representative keypoints for an image, (b) finding out that a matched area in the image corresponds to a first reference image according to the representative keypoints, (c) determining that a matched number between the representative keypoints and a plurality of reference keypoints of the first reference image is less than a threshold, and (d) storing the matched area of the image in the electronic apparatus as a second reference image.

According to the above descriptions, the image processing technology (at least including the image processing apparatus and method) provided in the present invention determines representative keypoints for an image by a density restriction based method. Briefly, the image processing technology of the present invention divides an image into a plurality of areas and restricts the number of representative keypoints in each of the areas. In this way, the representative keypoints of the image can be distributed on the image more uniformly. Therefore, even if an image comprises a specific object having more obvious feature values (e.g., a specific object that is more obvious in brightness contrast), the representative keypoints determined by the present invention will not be centered on the specific object. Therefore, even if the feature values of the target object to be identified and/or traced are not obvious (comparing to other feature values), the present invention can find appropriate representative keypoints with an appropriate number for comparison, so the probability of successfully identifying/tracing the target object can be improved.

Moreover, the image processing technology provided in the present invention may further utilize the representative keypoints for image comparison, thereby identifying/tracing the target object. The present invention compares the reference image stored previously with the representative keypoints and updates the stored reference image timely according to the result of the comparison. Therefore, the reference image used by the image processing technology for comparison when identifying/tracing the target object is closer to the environment status of the image that is currently being processed, and thus the probability that the target object is identified/traced in the image can be improved.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, the image processing apparatus and method provided in the present invention will be explained with reference to embodiments thereof. However, these embodiments are not intended to limit the present invention to any environment, applications or implementations described in these embodiments. Therefore, description of these embodiments is only for purpose of illustration rather than to limit the scope of the present invention. It should be appreciated that, in the following embodiments and the attached drawings, elements unrelated to the present invention are omitted from depiction; and dimensions of and dimensional scales among individual elements in the attached drawings are provided only for illustration, but not to limit the scope of the present invention.

Figure 1:
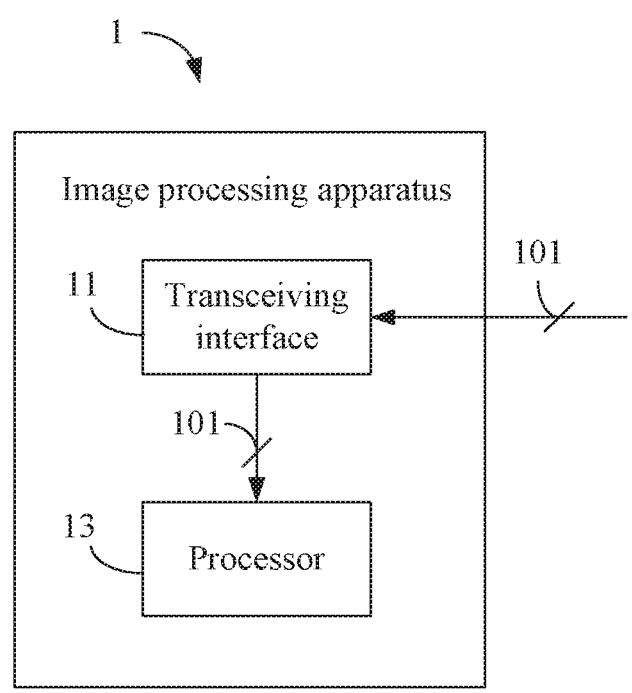
FIG. 1 depicts a schematic view of an image processing apparatus 1 according to a first embodiment.

A first embodiment of the present invention is an image processing apparatus 1, and a schematic view thereof is depicted in FIG. 1. The image processing apparatus 1 comprises a transceiving interface 11 and a processor 13, wherein the processor 13 is electrically connected to the transceiving interface 11. The transceiving interface 11 may be one of various wired or wireless interfaces capable of receiving signals and data, and the processor 13 may be any of various processing units, central processing units (CPUs), microprocessors, microcontroller units (MCUs) or other computing apparatuses known to those of ordinary skill in the art. The image processing apparatus 1 may be applied in various fields, e.g., Augmented Reality and safety monitoring, but not limited thereto.

In this embodiment, the image processing apparatus 1 determines a plurality of representative keypoints of an image by a density restriction based method. A user may determine, in advance or during the operation of the image processing apparatus 1, the number of representative keypoints to be found from an image, and the number is called a representative keypoint number.

Herein, it is assumed that an image 101 is received by the transceiving interface 11. Next, the processor 13 calculates a strength of each of pixels on the image 101 and takes the pixels whose strength is greater than a threshold as a plurality of initial keypoints of the image 101. For example, the processor 13 may take an absolute value of a brightness gradient of each of the pixels as the strength, but it is not limited thereto. As shall be appreciated by those of ordinary skill in the art, other values capable of distinguishing the strength of the feature values of the pixels may also serve as the strength, and this will not be further described herein.

The processor 13 divides the image 101 into a plurality of areas, wherein the areas are not overlapped with each other. It shall be appreciated that the number and the shape of the areas are not limited in the present invention. The processor 13 determines a plurality of representative keypoints from the initial keypoints of the image 101. During the process of determining the representative keypoints, the processor 13 makes reference to a threshold, and the threshold is the upper limit of the representative keypoints that each of the areas in the image 101 can have. In this embodiment, the processor 13 determines the threshold according to the number of the areas which the image 101 is divided into and the number of representative keypoints (e.g., obtain the threshold by dividing the number of representative keypoints by the number of the areas). In some embodiments, the threshold may be set by the user in advance. Next, the processor 13 determines the representative keypoints of each of the areas according to the threshold and the strength of each of the initial keypoints, wherein the number of the representative keypoints of each of the areas does not exceed the threshold.

Figure 2:
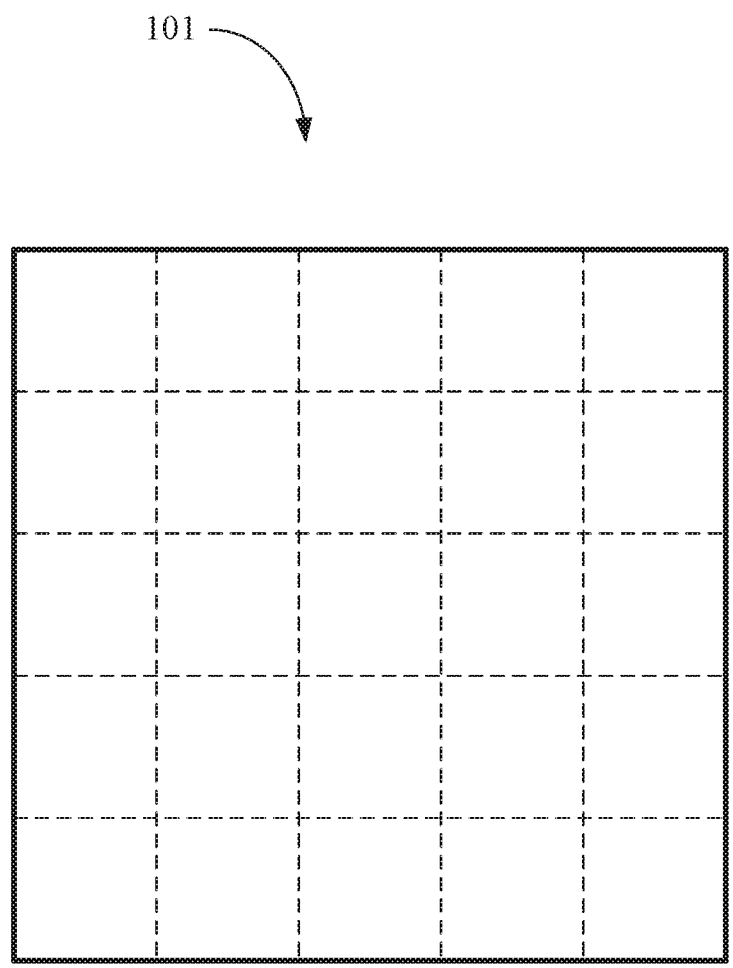
FIG. 2 depicts a schematic view of dividing an image into a plurality of areas.

For ease of understanding, a specific example is provided herein for detailing how the processor 13 determines the representative keypoints of the image 101, which, however, is not intended to limit the scope of the present invention. In this specific example, the representative keypoint number is 500, and the processor 13 divides the image 101 into 25 areas as shown in FIG. 2. Each of the initial keypoints determined by the processor 13 falls within one of the areas. The processor 13 calculates a threshold (e.g., 20) according to the representative keypoint number (i.e., 500) and the number of areas which the image 101 is divided into (i.e., 25). The processor 13 determines the representative keypoints of each of the areas according to the strength of the initial keypoints in each of the areas, e.g., selects the top twenty initial keypoints in terms of strength as the representative keypoints in each of the areas. It shall be appreciated that when the number of the initial keypoints in certain area(s) is smaller than the threshold, the actual number of the representative keypoints determined by the processor 13 will be smaller than the representative keypoint number.

In some embodiments, the processor 13 may determine a plurality of representative keypoints from the initial keypoints for the image 101 in another way. Specifically, the processor 13 selects one of the initial keypoints (which has not been selected/analyzed) as a to-be-analyzed keypoint according to a processing sequence and then determines whether the to-be-analyzed keypoint can serve as a representative keypoint. In some embodiments, the processor 13 sorts the plurality of initial keypoints from the initial keypoint having the greatest strength to the initial keypoint having the lowest strength as the processing sequence. For the to-be-analyzed keypoint selected each time, the processor 13 determines whether an accumulated number of the representative keypoints in the area to which the to-be-analyzed keypoint belongs is less than the threshold, wherein the accumulated number represents the number of the representative keypoints that have been determined in the area. If the accumulated number is smaller than the threshold, the processor 13 designates the to-be-analyzed keypoint as a representative keypoint and increase both the accumulated number and a global accumulated number (the number of representative keypoints that have been determined in the image 101) by one. If the accumulated number reaches the threshold, the processor 13 discards the to-be-analyzed keypoint (i.e., does not select the to-be-analyzed keypoint as a representative keypoint). The processor 13 repeats the aforesaid operations until the global accumulated number reaches the representative keypoint number or all the initial keypoints have been analyzed. It shall be appreciated that the way in which the processor 13 records the accumulated number of the representative keypoints in each of the areas is not limited in the present invention. For example, the processor 13 may record the accumulated numbers in a table or in other ways.

According to the above descriptions, the image processing apparatus 1 divides a to-be-analyzed image into a plurality of areas and restricts the number of representative keypoints that each of the areas (i.e., density restriction) can have. Therefore, the representative keypoints of an image determined by the image processing apparatus 1 are distributed in different areas of the image. By the aforesaid density restriction, even if an image comprises a specific object having more obvious feature values (e.g., a specific object that has high contrast in intensity), the representative keypoints determined by the image processing apparatus 1 will not be centered on the specific object. Therefore, the present invention can find an appropriate number of keypoints for the target object (the object to be identified/traced) having unobvious feature values in the image (which cannot be achieved by conventional technologies). As a result, image comparison technologies can improve the success rate of identifying/tracing the target object.

Figure 3:
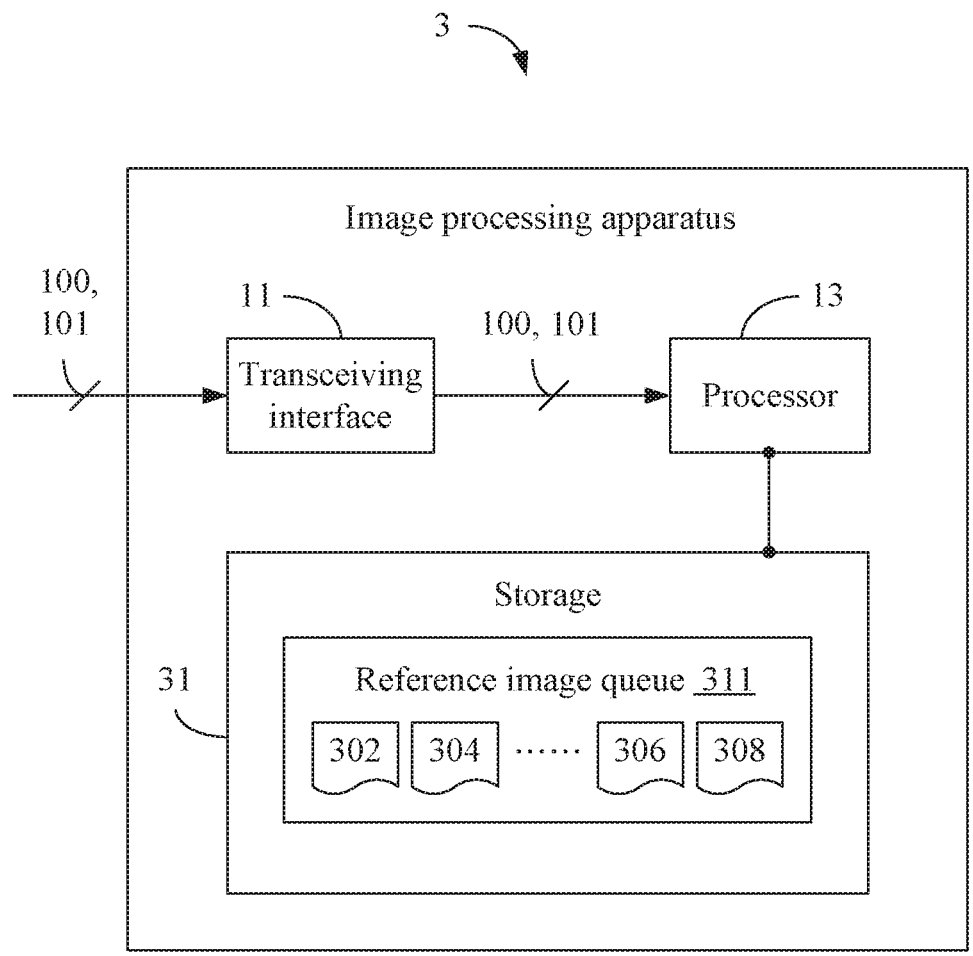
FIG. 3 depicts a schematic view of an image processing apparatus 3 according to a second embodiment.

A second embodiment of the present invention is an image processing apparatus 3 and a schematic view thereof is depicted in FIG. 3. The image processing apparatus 3 comprises the transceiving interface 11 and the processor 13 described in the aforesaid embodiments as well as a storage 31. The storage 31 may be a memory, a universal serial bus (USB) disk, a hard disk, a compact disk (CD), a mobile disk, or any other storage media or circuits with the same function and known to those of ordinary skill in the art. It shall be appreciated that in other embodiments of the present invention, the storage 31 may be external to the image processing apparatus 3.

In this embodiment, the processor 13 defines a reference image queue 311 in the storage 31 so as to store one or more reference images, wherein each of the reference images is an image of a target object. In the beginning, the reference image queue 311 comprises only one reference image. It shall be appreciated that, in other embodiments, it is unnecessary for the image processing apparatus 3 to store the reference images by defining the queue as long as the sequence in which the reference images are stored can be known. Moreover, in other embodiments, the storage 31 may store multiple reference images in the beginning.

In this embodiment, the image processing apparatus 3 determines a plurality of representative keypoints for the image received by the image processing apparatus 3, compares the received image with at least one reference image in the reference image queue 311 according to the representative keypoints, and then determines whether to update the reference image in the reference image queue 311 according to the result of the comparison.

Herein, it is assumed that the image 100 has been received by the transceiving interface 11 and the image 100 has been compared with at least one reference image in the reference image queue 311. The comparison method adopted in this embodiment will be described in detail later. After receiving the image 100, the transceiving interface 11 further receives an image 101 and the processor 13 determines a plurality of representative keypoints for the image 101.

Specifically, if the processor 13 previously finds out a matched area in the image 100 after comparing the image 100 with at least one reference image in the reference image queue 311 (i.e., the processor 13 finds out that the matched area contains the target object), the processor 13 determines a region of interest (RoI) (e.g., an area having same coordinates as the matched area) of the image 101 according to the matched area in the image 100 and finds out representative keypoints of the image 101 in the region of interest. For example, the processor 13 may calculate the strength (e.g., the absolute value of the brightness gradient) of each of the pixels in the region of interest of the image 101 and take the pixels whose strength is greater than a threshold as the representative keypoints of the image 101. It should be noted that in some embodiments if a matched area is found when comparing the image 100 with the reference image, the reference image may be used as a reference image first when the next image has to be compared. Since the reference image corresponds to the previous matched area found in the previous image (i.e., image 100), the success rate of finding out a matched area in the next image when comparing the next image with the reference image first can be increased.

If the processor 13 cannot find out a matched area in the image 100 after comparing the image 100 with all the reference images in the reference image queue 311 (i.e., the processor 13 cannot find out the target object in the image), the processor 13 determines a plurality of representative keypoints of the image 101 by the density restriction based method described in the first embodiment. Operation details thereof shall be appreciated by those of ordinary skill in the art based on the description of the first embodiment, and thus will not be further described herein.

After determining the representative keypoints of the image 101, the processor 13 compares the image 101 with at least one reference image in the reference image queue 311 according to the representative keypoints in order to determine whether the image 101 comprises the target object. For ease of understanding, it is assumed that the reference image queue 311 has stored the reference images 302, 304, ..., 306 and 308 sequentially. The processor 13 selects one of the reference images stored in the reference image queue 311 (e.g., the latest stored reference image 308), compares the image 101 with the reference image 308 according to the representative keypoints of the image 101, and determines whether a matched area corresponding to the reference image 308 can be found in the image 101 (i.e., whether the target object can be found in the image 101). It should be noted that if a reference image that is stored later than any other reference image in the storage (for example, the reference image 308 is latest stored) is selected for comparison, the success rate of finding out a matched area in the image 101 can be increased because it is highly possible that the reference image and the image 101 currently processed were taken in similar environment condition.

If the processor 13 cannot find out a matched area corresponding to the reference image 308 in the image 101 according to the representative keypoints of the image 101, the processor 13 will select another reference image (e.g., the second newest reference image 306) in the reference image queue 311 for comparison, and so on. The processor 13 repeats the aforesaid operations until the image 101 matches with a certain reference image (i.e., a matched area is found in the image 101) or all the reference images in the reference image queue 311 have been compared with the image 101. It shall be appreciated that the order in which the reference images are selected by the processor 13 is not limited in the present invention, e.g., the reference images may be selected sequentially from the head or the tail of the reference image queue or may be selected randomly. Moreover, how to compare the image 101 with the reference image according to the representative feature points of the image 101 is not the focus of the present invention. How the processor 13 performs image comparison according to the representative feature points shall be appreciated by those of ordinary skill in the art, and thus this will not be further described herein.

If the processor 13 finds out that a matched area in the image 101 corresponds to a reference image (e.g., the reference image 308) according to the representative keypoint of the image 101, the processor 13 further determines, during the image comparison process, whether a matched number between the plurality of representative keypoints of the image 101 and a plurality of reference keypoints of the reference image is less than a first threshold. If the matched number is smaller than the first threshold, it means that the similarity between the matched area that have been found and the reference image is below a preset standard. This means that maybe the environment where the image is captured currently is significantly different from the environment where the reference image is captured, e.g., the brightness of the current environment is reduced or improved. Therefore, the matched area of the image 101 is added into the reference image queue 311 of the storage 31 by the processor 13 to serve as another reference image. It shall be appreciated that the images received by the transceiving interface 11 at adjacent time points are usually captured under similar environment and condition. Therefore, adding the matched area which is successfully found by comparison but has a similarity below the preset standard into the reference image queue 311 can improve the success rate of the subsequent image comparison.

In some embodiments, the processor 13 manages the reference images stored in the storage 31 (e.g., the reference image queue 311) according to a First In First Out (FIFO) rule. Specifically, the processor 13 determines whether the number of the reference images stored in the storage 31 has reached a second threshold before adding a matched area into the storage 31 as a reference image. If the number of the reference images stored in the storage 31 has reached the second threshold (which means that the space of the storage 31 for storing the reference images is full), the processor 13 deletes the reference image (e.g., the reference image 302) that is added into the storage 31 earliest according to the FIFO rule.

According to the above descriptions, the image processing apparatus 3 identifies whether the received image comprises the target object. Briefly speaking, the image processing apparatus 3 determines a plurality of representative keypoints of the image (e.g., finds out the representative keypoints in the region of interest, or finds out the representative keypoints in the whole image by a density restriction based method) and then compares the image with at least one reference image in the reference image queue according to the representative keypoints. When the comparison succeeds (i.e., a matched area in the image corresponds to a certain reference image) but the similarity is below the preset standard (i.e., a matched number between the representative keypoints and a plurality of reference keypoints of the reference image is less than a first threshold), the image processing apparatus stores the matched area that is successfully found by comparison so that the matched area serves as a reference image. By updating the stored reference images, the image processing apparatus 3 can identify the target object in the image more accurately because the reference image used by the image processing apparatus 3 for image comparison and the image currently received are probably captured under similar environment condition. Moreover, when no matched area can be found in the previous image processed by the image processing apparatus 3, the image processing apparatus 3 determines representative feature points in the current image by a density restriction based method. Comparing to the conventional technology, the image processing apparatus 3 can find an appropriate number of keypoints for the target object having unobvious feature values in the image and, thereby, can identify the target object in the image accurately.

It shall be appreciated that the image processing apparatus 3 of the second embodiment is applicable in various fields. For example, if the image processing apparatus 3 is applied in the Augmented Reality (AR), the image processing apparatus 3 may perform two-stage comparison on each of the received images. During the coarse comparison of the first stage, the image processing apparatus 3 may compare an image with a reference image by aforesaid mechanism, and timely update the reference images stored in the storage 31. If the image processing apparatus 3 has found a matched area in the image at the first stage, fine comparison of the second stage is performed. At the second stage, the image processing apparatus 3 performs perspective transform on the matched area of the image, by which the object in the matched area will be transformed (e.g., transformed form a trapezoid into a rectangle). Thereafter, the image processing apparatus 3 compares the matched area on which the perspective transform has been performed with a positive reference image of the target object so as to find out the target object and the coordinate thereof in the matched area. Thereafter, the image processing apparatus 3 can estimate the position and the angle of the camera according to the aforesaid coordinate. Because the image processing apparatus 3 determines the keypoints by the density restriction based method in some conditions and updates the stored reference images timely (e.g., when the environment changes dynamically), the success rate for the comparison can be improved. As a result, the position and the angle of the camera can be calculated more accurately.

Figure 4:
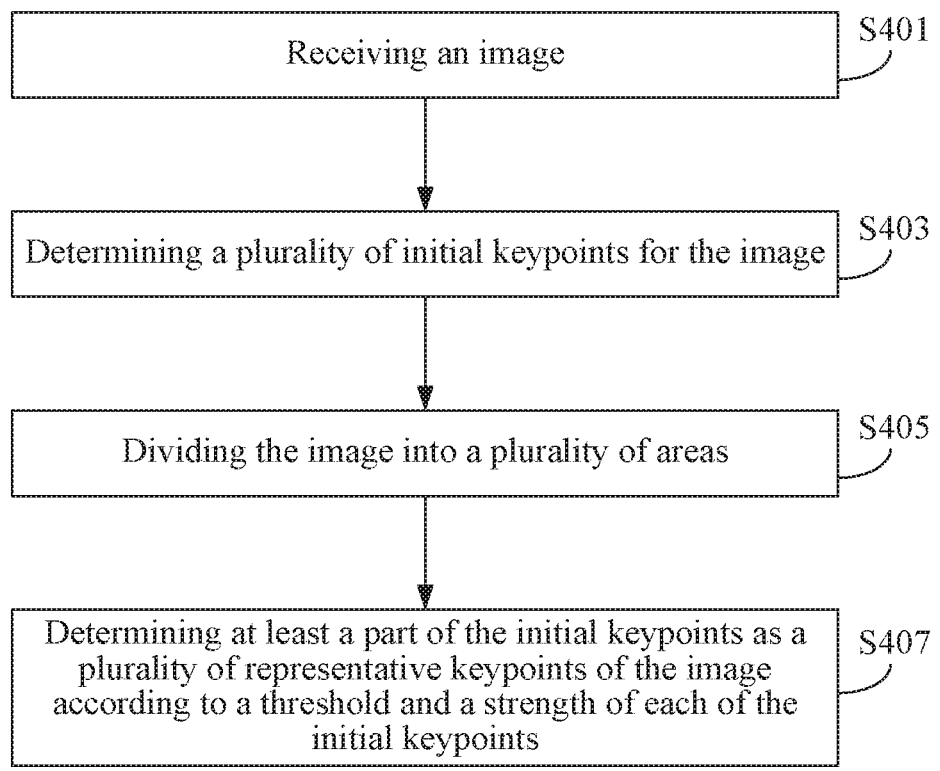
FIG. 4 depicts a flowchart of an image processing method according to a third embodiment.

A third embodiment of the present invention is an image processing method and a flowchart thereof is depicted in FIG. 4. The image processing method is adapted for an electronic apparatus, e.g., the image processing apparatus 1 of the first embodiment.

First, the electronic apparatus executes step S401 to receive an image. Next, step S403 is executed by the electronic apparatus to determine a plurality of initial keypoints for the image. For example, the step S403 may calculate a strength (e.g., an absolute value of a brightness gradient) of each of pixels on the image and take the pixels whose strength is greater than a threshold as the initial keypoints of the image. Additionally, step S405 is executed by the electronic apparatus to divide the image into a plurality of areas. It shall be appreciated that the order in which the steps S403 and S405 are executed is not limited in the present invention. In other words, the step S405 may be executed before the step S403, or the two steps may be executed simultaneously. Next, step S407 is executed by the electronic apparatus to determine at least a part of the plurality of initial keypoints as a plurality of representative keypoints of the image according to a threshold and a strength of each of the plurality of initial keypoints, wherein the number of the representative keypoints in each of the areas is not greater than the threshold.

In some embodiments, the step S407 selects one of the plurality of initial keypoints as a to-be-analyzed keypoint according to a processing sequence and then determines whether an accumulated number of the representative keypoints in the area to which the to-be-analyzed keypoint belongs is less than the threshold. If the accumulated number of the representative keypoints in the area to which the to-be-analyzed keypoint belongs is less than the threshold, the step S407 further designates the to-be-analyzed keypoint as one of the plurality of representative keypoints. If the accumulated number of the representative keypoints in the area to which the to-be-analyzed keypoint belongs is not less than the threshold, the step S407 discards the to-be-analyzed keypoint (i.e., the to-be-analyzed keypoint is not selected as the representative keypoint). The step S407 repeats the aforesaid processes until a total number of the determined representative keypoints reaches a predetermined number or all the initial keypoints have been analyzed.

Regarding the processing sequence adopted in the step S407, please note that the image processing method may sort the initial keypoints from the initial keypoint having the greatest strength to the initial keypoint having the lowest strength as the processing sequence in some embodiments.

In addition to the aforesaid steps, the third embodiment can also execute all the operations and steps of the image processing apparatus 1 set forth in the first embodiment, have the same functions, and deliver the same technical effects as the first embodiment. How the third embodiment executes these operations and steps, has the same functions, and delivers the same technical effects as the first embodiment will be readily appreciated by those of ordinary skill in the art based on the explanation of the first embodiment, and thus will not be further described herein.

Figure 5:
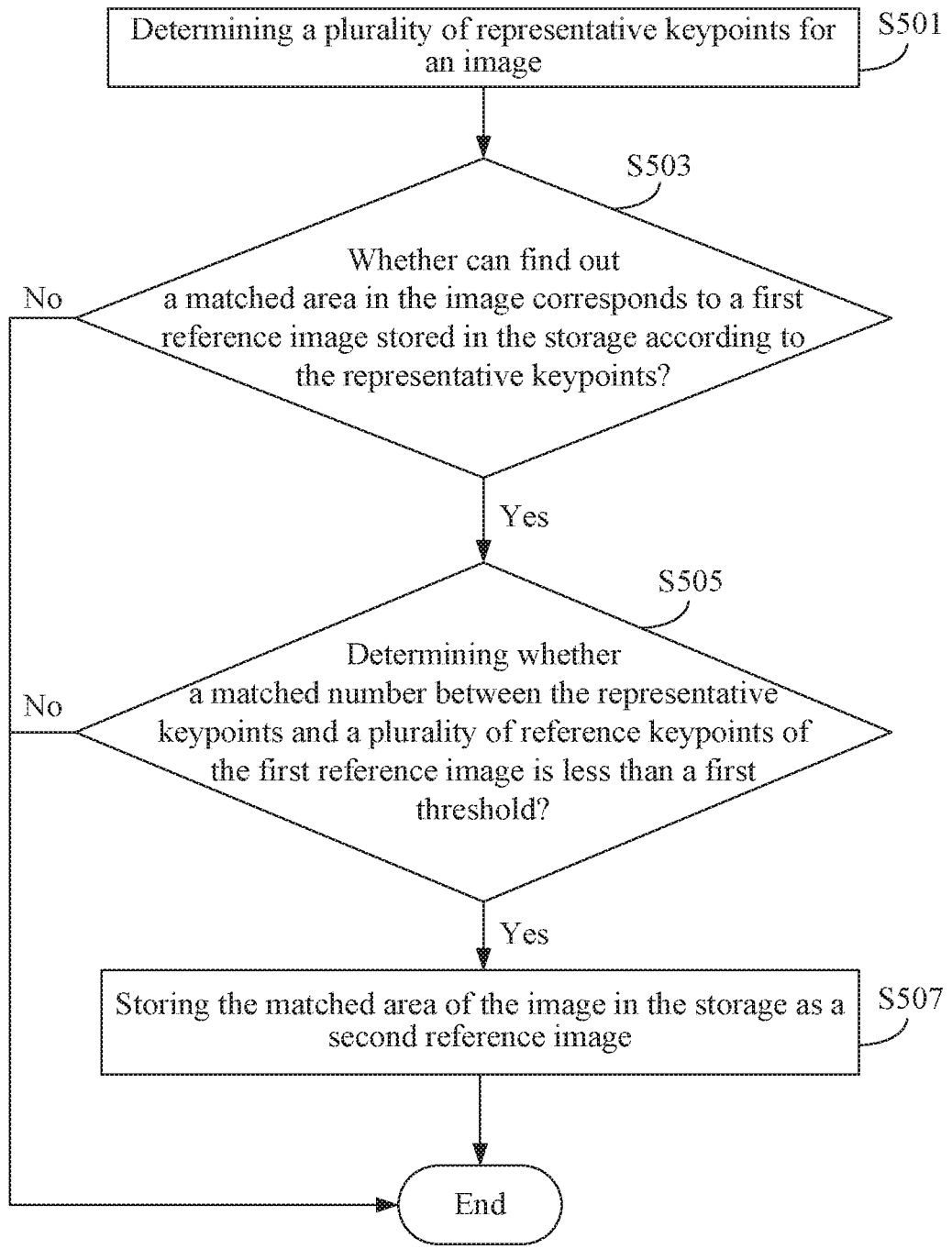
FIG. 5 depicts a flowchart of an image processing method according to a fourth embodiment.

A fourth embodiment of the present invention is an image processing method and a flowchart thereof is depicted in FIG. 5. The image processing method is adapted for an electronic apparatus, e.g., the image processing apparatus 3 of the second embodiment. The electronic apparatus stores at least one reference image.

First, the electronic apparatus executes step S501 to determine a plurality of representative keypoints for an image. For example, if another image has been processed previously by the image processing method and a matched area corresponding to a certain reference image stored in the electronic apparatus is found in the another image, the step S501 determines a region of interest of the image according to the matched area and determines the plurality of representative keypoints of the image in the region of interest. If the image processing method fails to find out a matched area corresponding to any reference image in the another image, the representative keypoints of the image are determined by the method described in the third embodiment.

Next, step S503 is executed by the electronic apparatus to determine whether a matched area corresponding to a certain reference image (which is called a "first reference image" for convenience) stored in the electronic apparatus can be found in the image according to the representative keypoints. If the determination result of the step S503 is no (it means that the comparison of the image is not successful), the image processing method ends the processing flow of the image. If the determination result of the step S503 is yes (it means that the comparison is successful), step S505 is executed by the electronic apparatus to determine whether a matched number between the plurality of representative keypoints and a plurality of reference keypoints of the first reference image is less than a first threshold. If the determination result is no, the image processing method ends the processing flow of the image. If the determination result of the step S505 is yes, step S507 is executed by the electronic apparatus to store the matched area of the image in the electronic apparatus.

In some embodiments, the image processing method first executes another step to determine whether the number of images stored in the electronic apparatus has reached a second threshold before executing the step S507. If the determination result is no, the step S507 is executed directly. If the determination result is yes, the image processing method further executes another step to delete, by the electronic apparatus, a third reference image in the electronic apparatus according to an FIFO rule.

In addition to the aforesaid steps, the fourth embodiment can also execute all the operations and steps of the image processing apparatus 3 set forth in the second embodiment, have the same functions, and deliver the same technical effects as the second embodiment. How the fourth embodiment executes these operations and steps, has the same functions, and delivers the same technical effects as the second embodiment will be readily appreciated by those of ordinary skill in the art based on the explanation of the second embodiment, and thus will not be further described herein.

It shall be appreciated that, those with ordinary knowledge in the art shall easily understand that the steps in the foregoing embodiments can be achieved by corresponding elements (for example, a computing operation performed by a processor, storing data by storage, transferring and receiving the data by the transceiving interface, etc.). In addition, in the specification and the claims of the present invention, terms "first," "second," and "third" used in the first reference image, the second reference image, and the third reference image are only used to represent different reference images. Moreover, the terms "first" and "second" used in the first threshold and the second threshold are only used to represent different thresholds.

According to the above descriptions, the image processing technology (at least including the image processing apparatus and method) provided in the present invention determines representative keypoints for an image by a density restriction based method. Briefly, the image processing technology of the present invention divides an image into a plurality of areas and restricts the number of representative keypoints in each of the areas so that the representative keypoints of the image can be distributed on the image more uniformly. Therefore, even if an image comprises a specific object having more obvious feature values (e.g., a specific object that is more obvious in brightness contrast), the representative keypoints determined by the present invention will not be centered on the specific object. Therefore, even if the feature values of the target object to be identified and/or traced are not obvious, the present invention can find appropriate representative keypoints/an appropriate number of representative keypoints for comparison, so the probability of successfully identifying/tracing the target object can be improved.

Moreover, the image processing technology provided in the present invention may further utilize the representative keypoints for image comparison, thereby identifying/tracing the target object. The present invention compares the reference image stored previously with the representative keypoints and updates the stored reference image timely according to the result of the comparison. Therefore, the reference image used by the image processing technology for comparison when identifying/tracing the target object is close to the image that is currently being processed because it is highly possible that they are captured under similar environment condition. Thus, the success rate that the target object is identified/traced in the image can be improved.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An image processing apparatus, comprising:
    a transceiving interface, being configured to receive an image; and
    a processor electrically connected to the transceiving interface, being configured to determine a plurality of initial keypoints for the image, divide the image into a plurality of areas, and determine at least a part of the initial keypoints as a plurality of representative keypoints of the image according to a threshold and a strength of each of the initial keypoints,
    wherein a number of the representative keypoints in each of the areas is not greater than the threshold,
    wherein the processor selects one of the initial keypoints as a to-be-analyzed keypoint according to a processing sequence, and designates the to-be-analyzed keypoint as one of the representative keypoints in response to determining that an accumulated number of the representative keypoints in the area to which the to-be-analyzed keypoint belongs is less than the threshold.

2. The image processing apparatus of claim 1, wherein the processor discards the to-be-analyzed keypoint in response to determining that the accumulated number of the representative keypoints in the area to which the to-be-analyzed keypoint belongs has reached the threshold.

3. The image processing apparatus of claim 1, wherein the processor sorts the initial keypoints from the initial keypoint having the greatest strength to the initial keypoint having the lowest strength as the processing sequence.

4. An image processing method, being adapted for an electronic apparatus and comprising the following steps:
    (a) receiving an image;
    (b) determining a plurality of initial keypoints for the image;
    (c) dividing the image into a plurality of areas; and
    (d) determining at least a part of the initial keypoints as a plurality of representative keypoints of the image according to a threshold and a strength of each of the initial keypoints;
    wherein the number of the representative keypoints in each of the areas is not greater than the threshold;
    wherein the step (d) comprises the following steps:
    selecting one of the initial keypoints as a to-be-analyzed keypoint according to a processing sequence;
    determining that an accumulated number of the representative keypoints in the area to which the to-be-analyzed keypoint belongs is less than the threshold; and
    designating the to-be-analyzed keypoint as one of the representative keypoints.

5. The image processing method of claim 4, wherein the step (d) comprises the following steps:
    determining that the accumulated number of the representative keypoints in the area to which the to-be-analyzed keypoint belongs has reached the threshold; and
    discarding the to-be-analyzed keypoint.

6. The image processing method of claim 4, wherein the step (d) further comprises the following step:
    sorting the initial keypoints from the initial keypoint having the greatest strength to the initial keypoint having the lowest strength as the processing sequence.

* * * * *